(12) United States Patent
Winger et al.

(10) Patent No.: US 8,760,119 B2
(45) Date of Patent: *Jun. 24, 2014

(54) SYSTEM AND METHOD FOR DYNAMIC POWER MANAGEMENT OF A MOBILE DEVICE

(71) Applicants: Lyall Kenneth Winger, Waterloo (CA); Dusan Veselic, Oakville (CA); Martin George Albert Guthrie, Moffat (CA)

(72) Inventors: Lyall Kenneth Winger, Waterloo (CA); Dusan Veselic, Oakville (CA); Martin George Albert Guthrie, Moffat (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,932

(22) Filed: Jun. 28, 2013

(65) Prior Publication Data

US 2013/0285614 A1   Oct. 31, 2013

Related U.S. Application Data

(63) Continuation of application No. 13/491,996, filed on Jun. 8, 2012, now Pat. No. 8,493,029, which is a continuation of application No. 12/436,498, filed on May 6, 2009, now Pat. No. 8,217,626.

(60) Provisional application No. 61/052,010, filed on May 9, 2008.

(51) Int. Cl.
*H02J 7/00* (2006.01)
*H02J 7/16* (2006.01)
*H02J 7/24* (2006.01)

(52) U.S. Cl.
USPC ............ 320/128; 320/132; 320/152; 320/157

(58) Field of Classification Search
CPC ........................................................ Y02E 60/12
USPC .......................................................... 320/128
See application file for complete search history.

(56) References Cited

U.S. PATENT DOCUMENTS 6,163,706 A   12/2000   Rozenblit et al.
6,405,054 B1   6/2002   Rozenblit et al.

(Continued)

FOREIGN PATENT DOCUMENTS

EP   1770848   4/2007
EP   1798835   6/2007
JP   2007312543   11/2007

OTHER PUBLICATIONS

Extended European Search Report, dated Oct. 2, 2009 for corresponding European Patent Application Serial No. 09159822.7.
Canadian Intellectual Property Office, Examiner's Report dated Oct. 24, 2011 for corresponding Canadian Patent Application Serial No. 2,665,340.

(Continued)

*Primary Examiner* — Edward Tso
*Assistant Examiner* — Ahmed Omar
(74) *Attorney, Agent, or Firm* — Bereskin & Parr LLP

(57) ABSTRACT

A mobile device adapted for dynamic power management. The mobile device includes an output power port, a voltage converter adapted to convert an input voltage to provide an output voltage to the output power port, and a processor. The processor is adapted to monitor at least one load electrically to determine when the at least one load will become active or inactive, determine a minimum required output voltage to be provided by the voltage converter based on the at least one load that will become active or inactive, control the voltage converter to provide at least the minimum required output voltage on the output power port in advance of the at least one load becoming active or after the at least one load becomes inactive, and when the input voltage is below the first threshold, control the voltage converter to reduce the output voltage.

20 Claims, 7 Drawing Sheets

(56) References Cited

U.S. PATENT DOCUMENTS

| | | |
|---|---|---|
| 6,552,446 B1 | 4/2003 | Lomba et al. |
| 7,853,813 B2 * | 12/2010 | Lee .............................. 713/320 |
| 2001/0020802 A1 | 9/2001 | Kitagwa et al. |
| 2001/0050547 A1 | 12/2001 | Takinoto et al. |
| 2003/0085621 A1 | 5/2003 | Potega |
| 2005/0184712 A1 | 8/2005 | Wei et al. |
| 2006/0192530 A1 * | 8/2006 | Nguyen ........................ 320/128 |
| 2006/0244420 A1 * | 11/2006 | Stanesti et al. ................ 320/128 |

OTHER PUBLICATIONS

Extended European Search Report, dated Feb. 25, 2013, for corresponding European Divisional Patent Application Serial No. 10180100.9.

Korean Patent Office, Office Action dated Jun. 21, 2013, for corresponding Korean Patent Application Serial No. 10-2012-0027380.

Korean Patent Office, Notice of Allowance dated Nov. 6, 2013, for corresponding Korean Patent Application Serial No. 10-2012-0027380.

* cited by examiner

SYSTEM AND METHOD FOR DYNAMIC POWER MANAGEMENT OF A MOBILE DEVICE

This application is a continuation of U.S. patent application Ser. No. 13/491,996, filed Jun. 8, 2012, which was a continuation of U.S. patent application Ser. No. 12/436,498, filed May 6, 2009 (now U.S. Pat. No. 8,217,626), which claimed the benefit of U.S. Provisional Application No. 61/052,010 filed on May 9, 2008, the entire contents of all of which are hereby incorporated by reference herein for all purposes.

This application relates to dynamic power management and in particular, to a system and method for dynamic power management that makes use of a single voltage converter.

Mobile communication devices are in use throughout everyday life. It is becoming more and more common to include a broader array of capabilities and functionality into mobile devices. There is also pressure to make these mobile devices increasingly smaller. At the same time, there is an on-going need to improve the performance of these devices so that they run for an extended length of time between recharging or battery replacement.

The goal of providing longer battery life has resulted in a movement towards lower voltage level batteries, which will provide for longer discharge times. However, using low voltage level batteries typically leads to issues with regards to providing enough power to the mobile device to accommodate the increased level of functionality that is provided by the mobile device which includes various communication features, cameras, flashes, music playback, screen or keyboard backlights and the like. Accordingly, better power management techniques are needed such that longer battery life can be achieved and/or battery size can be reduced.

GENERAL

In one aspect, at least one of the embodiments described herein provides a method for dynamic power management of a mobile device. The mobile device comprises a plurality of loads and a battery charger electrically connected to a voltage rail of the mobile device. The method comprises providing an input voltage level to a single voltage converter of the mobile device; monitoring the plurality of loads to determine when at least one of the loads will become active or inactive; determining a minimum required output voltage level to be provided by the voltage converter based on active loads voltage level requirements and the at least one load that will become active or inactive voltage level requirement; and adjusting the input voltage level via the voltage converter to provide the minimum required output voltage level on the voltage rail in advance of the at least one load becoming active or after the at least one load becomes inactive. The method further monitors the input voltage level, and determines whether the input voltage level falls below a first predetermined threshold. In the event that the input voltage level falls below the first predetermined threshold, the method further reduces the output voltage level of the voltage converter, thereby reducing a charging rate of the battery charger.

The step of adjusting the received input voltage level can comprise increasing the output voltage level to a higher voltage level when the at least one load becomes active.

The step of adjusting the received input voltage level can comprise reducing the output voltage level to a lower voltage level when the at least one load becomes inactive.

In another aspect, at least one of the embodiments described herein provides a system for dynamic power management on a mobile device, the mobile device comprising a plurality of loads and a battery charger electrically connected to a voltage rail of the mobile device. The system comprises a single voltage converter electrically couple to the voltage rail and configured to receive an input voltage level and adjust the received input voltage level to provide an output voltage level to the voltage rail; and a processor configured to monitor the plurality of loads to determine when at least one of the loads will become active or inactive; determine a minimum required output voltage level to be provided by the voltage converter to adjust the input voltage level to provide the minimum required output voltage on the voltage rail for all active loads in advance of the at least one load becoming active or after the at least one load becomes inactive. The processor is further configured to monitor the input voltage level to determine whether it falls below a first predetermined threshold, and when the input voltage level falls below the first predetermined threshold, control the voltage converter to reduce the output voltage level thereby reducing a charging rate of the battery charger.

In another aspect, at least one of the embodiments described herein provides a computer readable medium storing instructions that, when executed on a processor, cause the processor to monitor a plurality of loads connected to a voltage rail to determine when at least one of the loads will become active or inactive; determine a minimum required output voltage level for the voltage rail based on active loads and the at least one load that will become active or inactive; and control a single voltage converter to adjust an input voltage level to provide the minimum required output voltage level on the voltage rail in advance of the at least one load becoming active or after the at least one load becomes inactive. The computer readable medium further stores instruction that, when executed on the processor, cause the processor to monitor the input voltage level; determine whether the input voltage level falls below a first predetermine threshold, and when the input voltage level falls below the first predetermined threshold, control the voltage converter to reduce the output voltage level thereby reducing a charging rate of the battery charger.

BRIEF DESCRIPTION OF THE DRAWINGS

For a better understanding of the embodiments described herein and to show more clearly how they may be carried into effect, reference will now be made, by way of example only, to the accompanying drawings which show the example embodiments and in which:

FIG. 3 is a block diagram of an example embodiment of a wireless network that the mobile communication device of FIG. 1 may communicate with;

DESCRIPTION OF PREFERRED EMBODIMENTS

Figure 1:
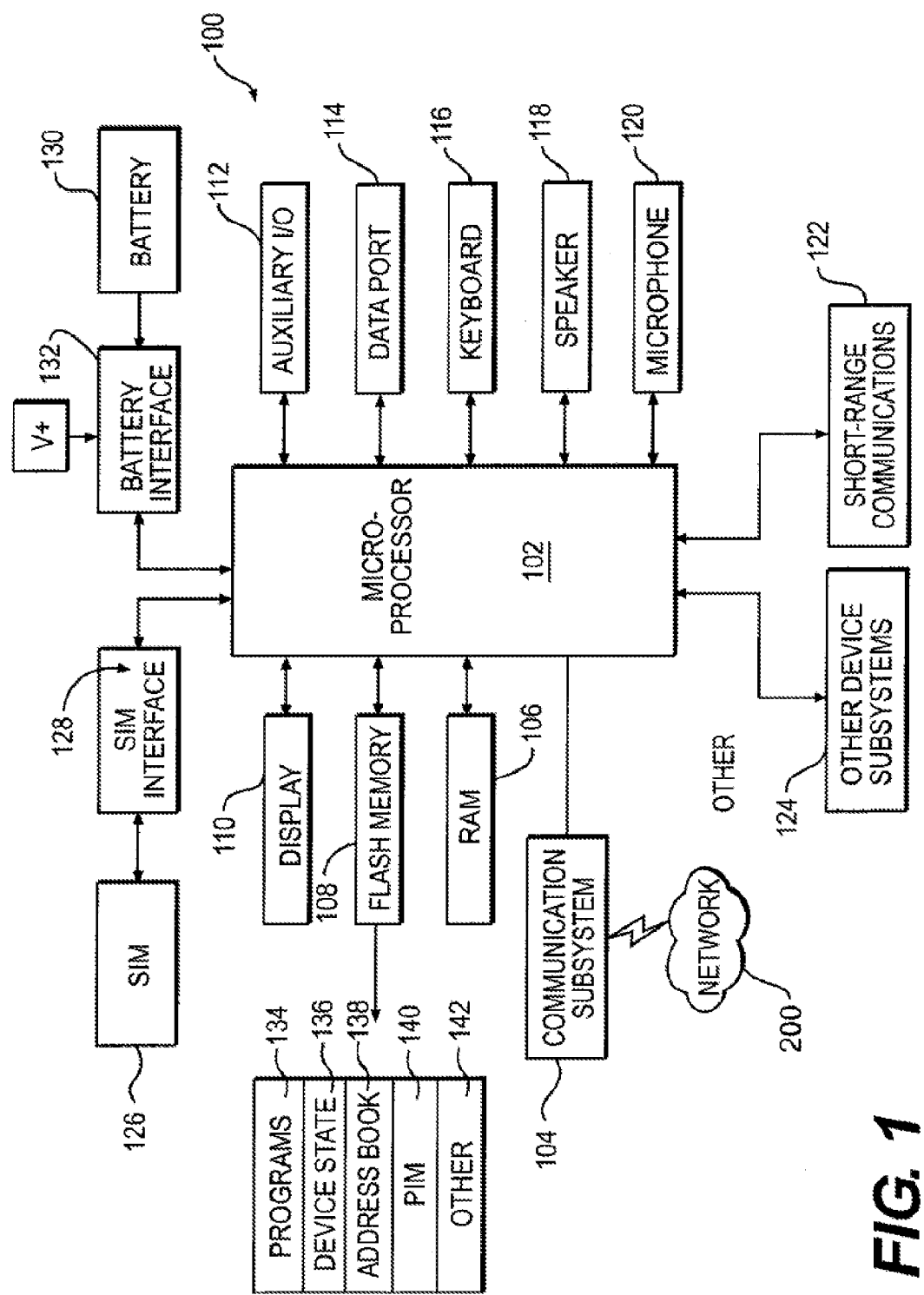
FIG. 1 is a block diagram of an example embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein. Furthermore, it should be noted that the terms "exemplary embodiment" or "example embodiment" is used herein to denote an example of an embodiment of a device or method, and does not necessarily indicate a preferred implementation of the device or method.

Some of the embodiments make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Referring first to FIG. 1, shown therein is a block diagram of a mobile device 100 in one example implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122, and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The other device subsystems 124 can include a wide variety of components that have different supply voltage level requirements. For example, the other device subsystems 124 can include a camera, a camera with a flash, lighting units for the display 110 and/or keyboard 116 and the like.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The main processor 102, in addition to its operating system functions, enables execution of software applications 134 on the mobile device 100. The subset of software applications 134 that control basic device operations, including data and voice communication applications, will normally be installed on the mobile device 100 during its manufacture, or be added at a later time by means of a computer or downloaded from Internet. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and other mobile devices, computer systems or accessory devices, without the use of the wireless network 200. For example, the subsystem 122 can include a wireless transmitter/receiver and associated circuits and components for short-range communication. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices. The establishment of short-range communications is described in greater detail below.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary I/O subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
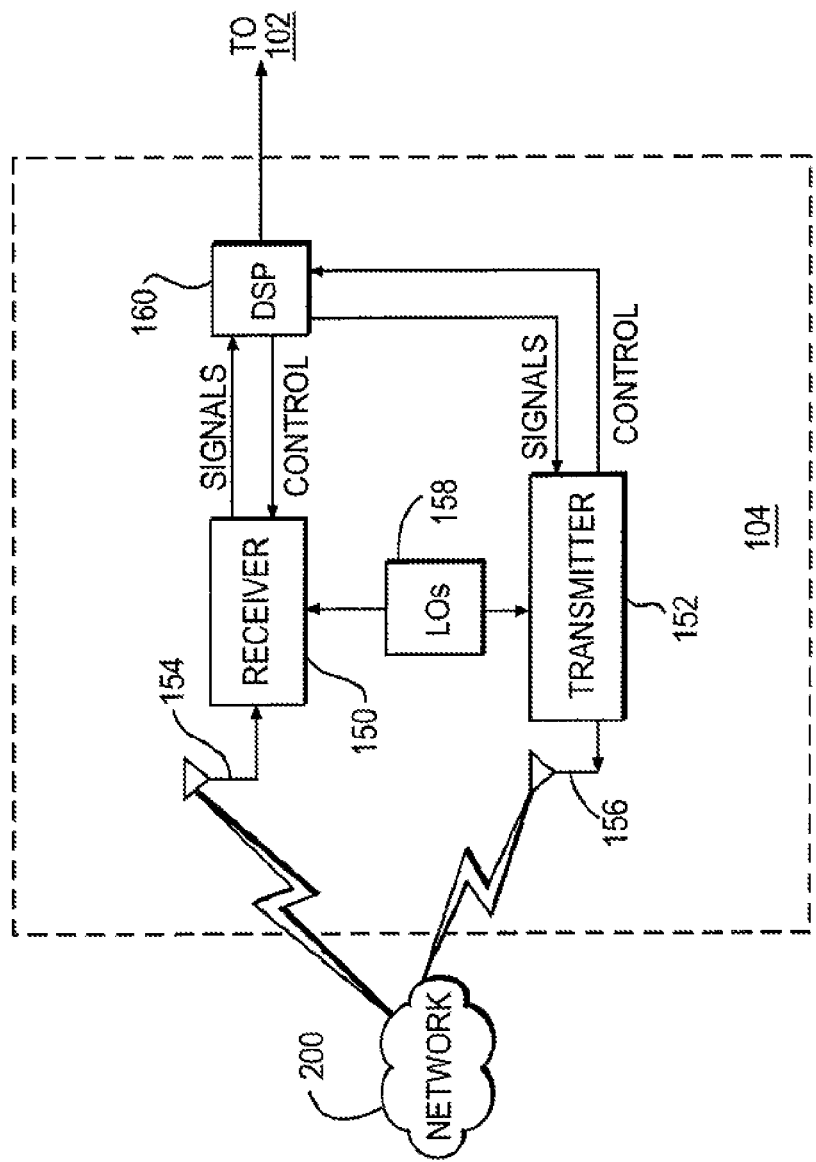
FIG. 2 is a block diagram of an example embodiment of a communication subsystem component of the mobile communication device of FIG. 1.

Referring now to FIG. 2, a block diagram of an example embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. ND conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gain/attenuation applied to communication signals in the receiver 150 and transmitter 152 can be adaptively controlled through automatic gain/attenuation control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
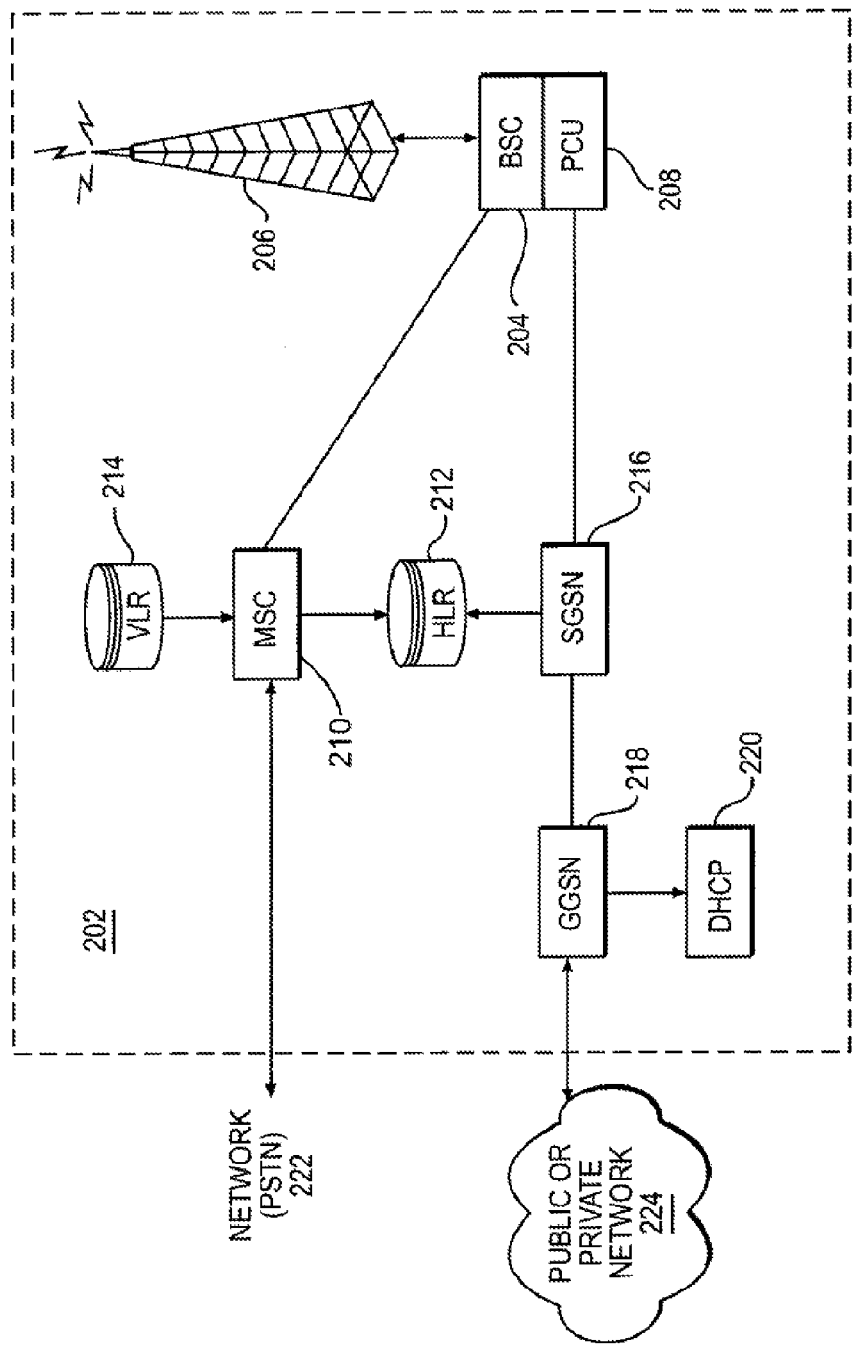

Referring now to FIG. 3, a block diagram of an example embodiment of a node of the wireless network 200 is shown as 202. In practice, the wireless network 200 comprises one or more nodes 202. The mobile device 100 communicates with the node 202. In the example implementation of FIG. 3, the node 202 is configured in accordance with General Packet Radio Service (GPRS) and Global Systems for Mobile (GSM) technologies. Examples of node 202 include a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of nodes is not meant to be an exhaustive list of all nodes 202 within a GSM/GPRS network, but rather a list of nodes that can be used in communications through the wireless network 200.

In a GSM network, the MSC 210 is coupled to the BSC 204 and to a land line network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The tower station 206 is a fixed transceiver station. The tower station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the tower station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one fixed transceiver equipment may employ a different modulation scheme and operate at different frequencies than other fixed transceiver equipments.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Using the above described general mobile device environment as an example environment for communications, an example embodiment of a system and method for dynamic power management will be described. It will be understood that the system and method for dynamic power management may also be used in other electronic systems that make use of a power supply to supply various components with various functions.

Figure 4:
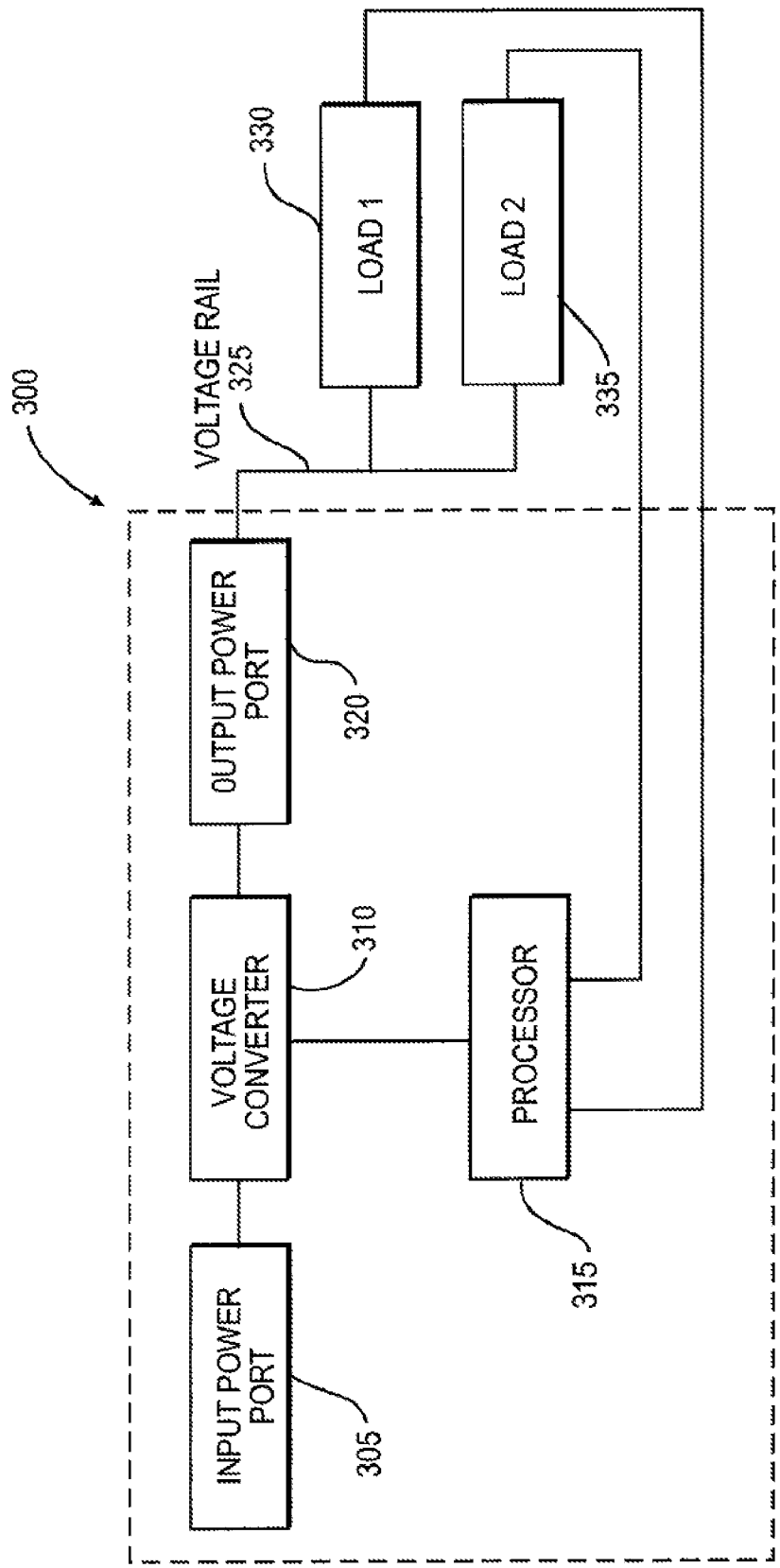
FIG. 4 is a functional block diagram of an example embodiment of a system for dynamic power management.

FIG. 4 is a block diagram of an example embodiment of a system for dynamic power management 300 that can be implemented in, for example, the mobile device 100. Generally speaking, the system 300 includes an input power port 305, a voltage converter 310, a processor 315 and an output power port 320. Generally speaking, power enters the system 300 through the input power port 305, travels through the voltage converter 310, where the input power is adjusted/regulated such that the voltage level provided to the output power port 320 is controlled to be at a particular level based on instructions received from the processor 315. In the mobile device 100, the power from the output power port 320 is provided to a voltage rail 325 of the mobile device 100 and the voltage rail 325 is connected to a plurality of loads related to the mobile device 100. In FIG. 4, two loads, a first load 330 and a second load 335 are shown.

The input power port 305 may receive power from various sources such as an AC power line, a battery, a USB charge line, an AC main powered DC charging source and the like (not shown in FIG. 4) that may be available to the mobile device 100. Similarly, the plurality of loads 330, 335 may include display screens, power amplifiers (e.g. for radio transmission), etc. and may also include a rechargeable battery that requires charging from time to time. The processor 315 is in data communication with the voltage converter 310 and with the loads 330, 335 in order to control the voltage converter 310 to provide an output voltage level in such a way that it corresponds with efficient power usage (i.e. minimization of headroom) while providing an appropriate amount of power (i.e. voltage and current levels) to the loads 330, 335.

Using this arrangement, the voltage and current levels transmitted via the voltage rail 325 can be dynamically changed to allow efficient higher voltage functions to be enabled and disabled based on when the higher voltage level is required in order to optimize the power consumption efficiency in the mobile device 100. The voltage rail 325 is thus a variable voltage rail. Thus, the processor 315 is notified when a load 330 with, for example, higher voltage level requirements is to be activated and the processor 315 controls the voltage converter 310 to increase the voltage level on the voltage rail 325 to the required voltage level to allow the load 330 to operate. When the load 330 is no longer active, the processor 315 then controls the voltage converter 310 to lower the voltage level on the voltage rail 325. The voltage converter 310 controls the voltage rail 325 based on active/inactive status and voltage level requirements of each of the plurality of loads 330, 335 that are connected to the voltage rail 325.

In a conventional system, each load is typically provided with an individual voltage converter that is designed to provide the appropriate voltage level for the load. While this arrangement can improve overall system efficiency, it also requires that the main voltage rail provide sufficient power to drive each voltage converter to the level needed for its load at an appropriate time. Also, the usage of more converters results in more power Field-Effect Transistors (FETs) being used in the system. This contrasts with the present embodiment in which one voltage converter 310 adjusts the voltage rail 325 for the plurality of loads 330, 335 in a dynamic manner.

Typically, voltage requirement for each load is stored in a look-up table (not shown), which is accessed by the processor 315 upon detection that a load must be activated or deactivated.

Figure 5:
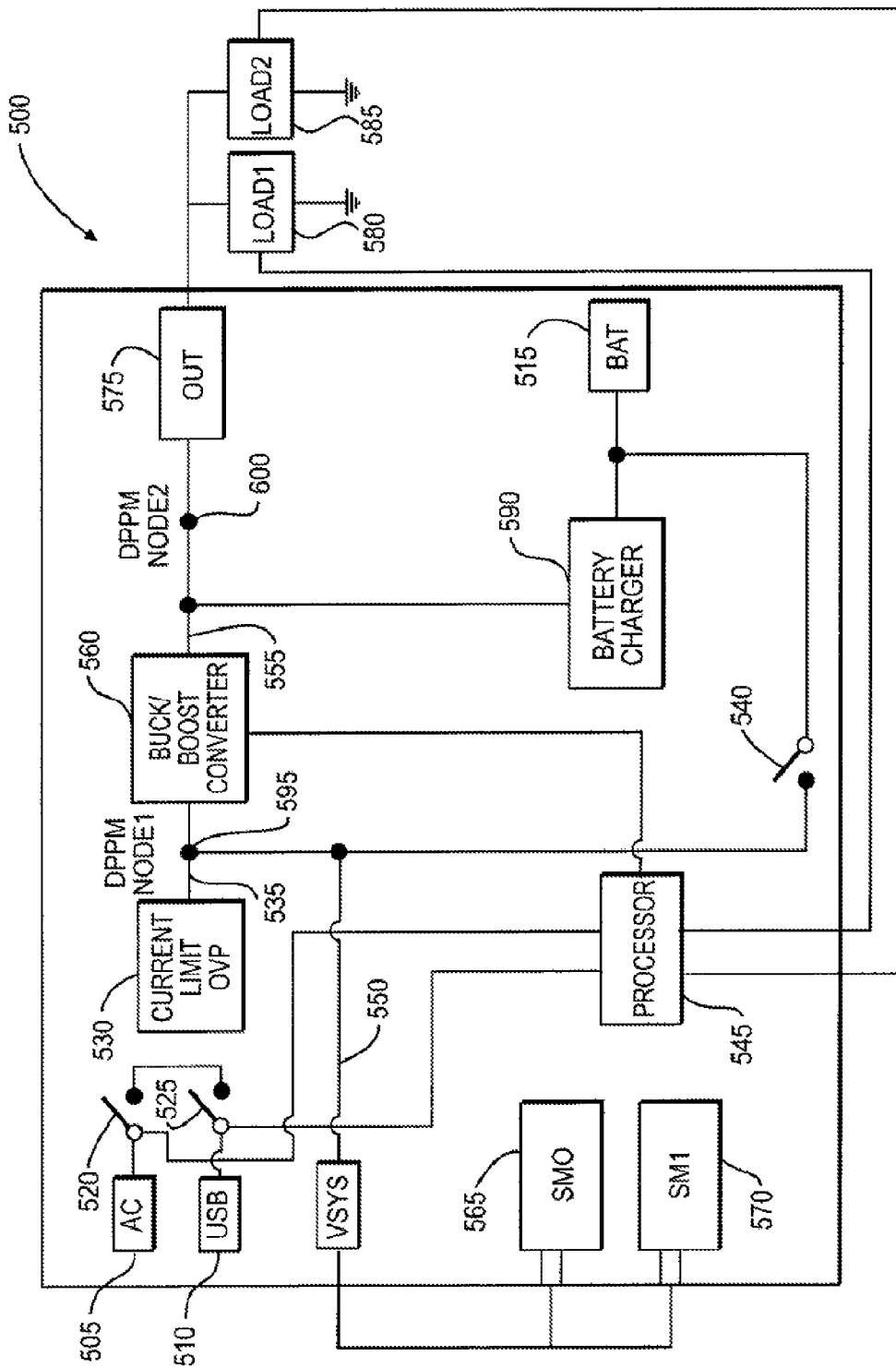
FIG. 5 is a functional block diagram of another example embodiment of a system for dynamic power management.

FIG. 5 is another example embodiment of a system for power management 500. In FIG. 5, the system 500 is shown with a plurality of possible inputs and includes additional components as described below.

The system 500 includes three inputs: AC input 505, USB input 510 and battery input 515. As shown, input power from the AC input 505 and USB input 510 pass through and are controlled by switches 520 and 525, respectively. The switches 520 and 525 allow for connection of only one of the AC input 505 and the USB input 510 at a time to a Current Limit Over Voltage Protection (OVP) module 530 which further controls the flow of input power from the AC input 505 or the USB input 510. The input power from the AC input 505 or USB input 510 are then fed to the mobile device voltage rail 535. The input power from the battery input 515 is connected to a switch 540, which determines whether it is connected to the mobile device voltage rail 535.

The switches 520, 525 and 540 are controlled by a processor 545 such that input power is fed from one of the AC input 505, the USB input 510, and the battery input 510, as available and appropriate to power the mobile device 100. As will be understood, in typical operation, power will be fed from only one source at a time by having only one switch closed at a given time.

The mobile device voltage rail 535 is divided into a fixed voltage rail 550 and a variable voltage rail 555. The variable voltage level of the variable voltage rail 555 is adapted by a voltage converter 560 that provides an output voltage level that can be lower or higher than the input voltage level it receives. In one particular embodiment, the voltage converter 560 is a buck/boost converter. The voltage converter 560 is adapted to receive through the mobile device voltage rail 535 voltage levels varying for example from 2.5 Volts to 4.4 Volts when the switch 540 for the battery is closed, and voltage levels varying for example between 5 Volts to 6 Volts when either the switch 520 of the AC input 505 is closed, or the switch 525 of the USB input 510 is closed. The voltage levels provided for the mobile device voltage rail 535, voltage converter 560, AC input 505 and USB input 510 are not limited thereto, but rather provided as examples for depicting voltage level differences between the various components. Generally, the output voltage level is determined by the load(s) of the mobile device 100. For example, the minimum voltage level will be the voltage level required to maintain regulation on the supply rails that are basic functionality, and the maximum voltage level will be determined by the load that requires the highest operating voltage level. The system 500 can be configures so that the voltage converter 560 accepts power from a portable device power source (such as a Lithium battery, a fuel cell, etc).

The fixed voltage rail 550 operates as a conventional voltage rail. The fixed voltage rail 550 is connected to a plurality of switch modules (SM0 module 565 and SM1 module 570), which are configured to provide a predetermined voltage level to predetermined loads (not shown) of the mobile device 100. In particular, the fixed voltage rail 550 is configured to provide power to loads that have relatively constant voltage level requirements or that can operate at a lower power level that may be readily available even from the USB input 510 or from the battery input 515 when the battery is running low on power or is a low voltage level battery.

The variable voltage rail 555 is controlled by the voltage converter 560 to provide a variable voltage level to various system components (loads) of the mobile device 100. In some embodiments, this can also include recharging the battery (as described in further detail below). The variable voltage rail 555 provides power to loads that may require more voltage level at the time that they are operating but may generally operate less frequently than the loads that are connected to the fixed voltage rail 550. Such loads may include a display screen, a camera flash, an audio output or volume stage, a power amplifier, a lighting module to provide various lighting features and the like.

The variable voltage rail 555 is connected to an output power port 575 where various system loads, such as load1 580 and load2 585, are connected. The voltage converter 560 adjusts the input voltage level (for example to provide a buck or boost to the input voltage level) to an appropriate voltage level for output to the variable voltage rail 555 based on the needs of the loads load1 580 and load2 585. In some cases, the voltage level output for the variable voltage rail 555 may be in a range of approximately 3 Volts to 5 Volts. In some embodiments, the variable voltage rail 555 is connected to a plurality of Low Drop-Out regulators (LDO's) (not shown) running for example, at approximately 2.7 to 3.3 Volts.

In a similar way to the system 300 of FIG. 4, the processor 545 of the system 500 of FIG. 5 monitors the system loads and adjusts the voltage level output by the voltage converter 560 to provide a sufficient and efficient voltage level to the system loads (for example, load1 580, and load2 585) while in use. Once a particular load is no longer in use, the processor 545 controls the voltage converter 560 to output the voltage level necessary to supply any remaining loads. A lookup table of different load requirements or voltage level requirements for different modes of operation or additional analog/digital feedback from output regulators can be used to determine the required output voltage level. When there is more than one load/feature that is active and which requires a change in output voltage level, output voltage level is set to be the output voltage level for the load/feature that has the higher voltage level requirement.

Embodiments of the system and method of power management described can be used with lower voltage level batteries, such as low voltage level lithium batteries, where the operating range is typically from 4.4 Volts down to approximately 2.0 Volts. In this case, there is expected to be a need to be able to raise (i.e. boost) the low battery voltage level up to an appropriate value for the voltage rail in the mobile device to supply various higher voltage level components as described above. In a similar way, some mobile device components are also moving to lower voltage level operating requirements such that there may be a situation in which a voltage rail in the mobile device may be lowered (i.e. bucked down) to a lower voltage level such as 2.85 Volts, compared to the input power voltage level, to supply various components and thereby increase overall system efficiency. An example of such a load is a Wireless Local Area Network Power Amplifier (WLAN PA), which typically runs at 2.7 Volts. By powering the WLAN PA directly from the voltage converter, it would be possible, if no other high voltage level loads were enabled, to drop the voltage level on the variable rail 555 to 2.7 Volts.

Figure 6:
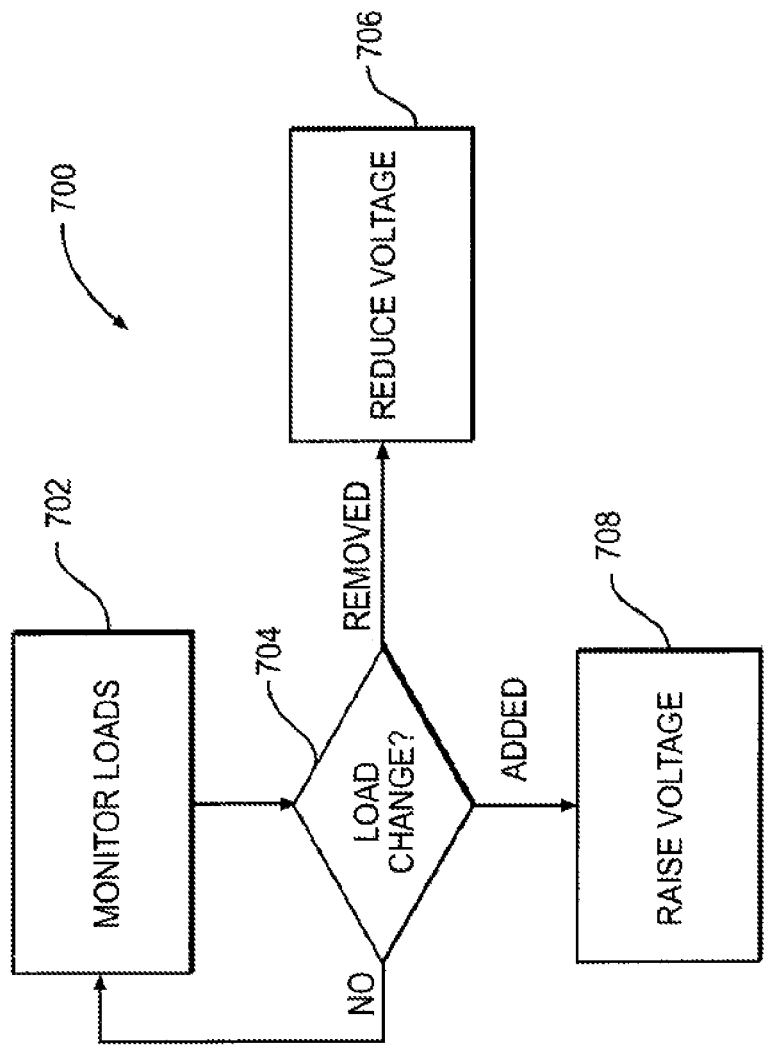
FIG. 6 is a flowchart of an example embodiment of a method for dynamic power management.

FIG. 6 shows a flow chart of an example embodiment of a method 700 of dynamic power path management according to one example embodiment. At step 702, the processor 545 monitors the various loads that are connected to the variable voltage rail 555. At step 704, when a change in the status of the loads is provided to the processor 545, it is determined whether or not the status is the addition of a load or the removal of a load. When there is no change in the status then the processor 545 continues monitoring the loads at step 702. When an additional load is to be activated, then at step 708 the voltage converter 560 raises the voltage level on the variable voltage rail to an appropriate voltage level to handle the voltage level requirements of the added load. The amount by which the voltage level of the variable voltage rail 555 needs to be raised can be determined by, for example, calculation, a look-up table, or other appropriate methods as described previously. When a load has been removed, then at step 706 the voltage converter 560 reduces the voltage level of the variable voltage rail 555 as appropriate following the removal of the load, in order to increase efficiency of power consumption. In the event that the load currently active requires a higher voltage level than the load to be activated, the output voltage level of the voltage converter will correspond to the highest voltage level required, and therefore, the output voltage level will not be raised to adjust to the activating of the load.

As shown in FIG. 5, the AC input 505 and USB input 510 might also be used to recharge the battery (not shown in FIG. 5) via a battery charger 590 and the battery input 515. In the charging of the battery, the variable voltage rail 555 also provides a dynamic power path. In particular, the processor 545 or a control loop (not shown) monitors a Dynamic Power Path Management (DPPM) Node1 595 and a DPPM Node2 600 with regard to the voltage levels needed for charging the battery and controls the battery charger 590 to adjust the charging of the battery with greater efficiency and to ensure that other system loads can continue operating even while the battery is being charged.

In this embodiment, the dynamic power path has two control loops. The first control loop is related to the DPPM Node1 595, which monitors the instant voltage level received from any of the inputs, AC input 505 or USB input 510. During charging, when the system load causes the voltage level at DPPM Node1 595 to drop to a first predetermined voltage level threshold that starts to compromise system efficiency (for example 4.35 Volts), then the output voltage level of the voltage converter 560 is reduced to reduce the charging rate of the battery by reducing the headroom between the output of the voltage converter 560 and the output of the battery charger 590, thus reducing the charge rate and the power dissipation.

The second control loop is related to the DPPM Node2 600, which monitors the voltage level of the variable voltage rail 555 and decreases the charge rate of the battery when the voltage level of the variable voltage rail 525 reaches a second predetermined voltage level threshold. This allows the variable voltage rail 555 to be regulated at a minimum voltage level required to maintain the operation of the components (load1 580 and load2 585, and battery charger 590) connected to the variable voltage rail 555. In particular, the charge rate of the battery may be decreased by, for example, reducing the output current of the battery charger 590.

It will be understood that the first and second predetermined voltage thresholds will be selected based on efficient use of the input power available and in some embodiments may be variable depending on operating characteristics of the mobile device 100 or the like.

The use of dynamic power management in charging the battery can prevent problems with power dissipation in the recharging process. This can be helpful in cases in which the size of the power management integrated circuit (PMIC) decreases. In a particular case, it may be necessary to function at approximately 3.3 Volts (i.e. the dead battery voltage level) and provide approximately 1-1.5 Amps through the battery port 515 (depending on the type of battery).

Figure 7:
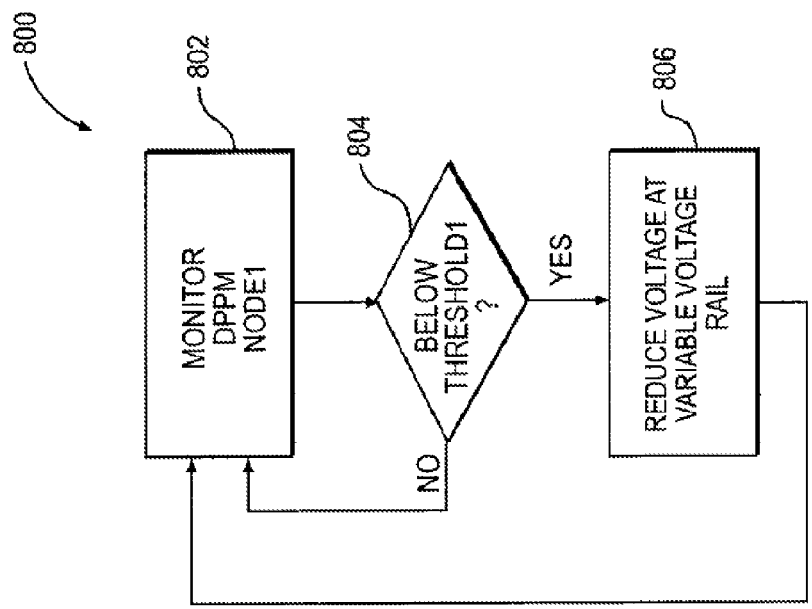
FIG. 7 is a flowchart of an example embodiment of a method for dynamic power management involving battery charging.

FIG. 7 shows a flow chart of a method 800 for dynamic power management according to another example embodiment. At step 802, the method begins with the processor 545 monitoring the DPPM Node1 595 for voltage level. At step 804, the processor 545 determines whether the voltage level at DPPM Node1 595 is below a predetermined first threshold voltage level (i.e. threshold1). When the voltage level at DPPM Node1 595 is above the voltage level threshold1, the method 800 returns to monitoring the DPPM1 node 595 at step 802. However, when the voltage level at DPPM Node1 595 is below the voltage level threshold1, at step 806, the processor 545 controls the voltage converter 560 to reduce the voltage level of the variable voltage rail 555 to reduce the overhead at the battery charger 590 and thus reduce the charging rate of the battery. The method 800 then returns to monitoring the voltage level at the DPPM Node1 595 at step 802.

Figure 8:
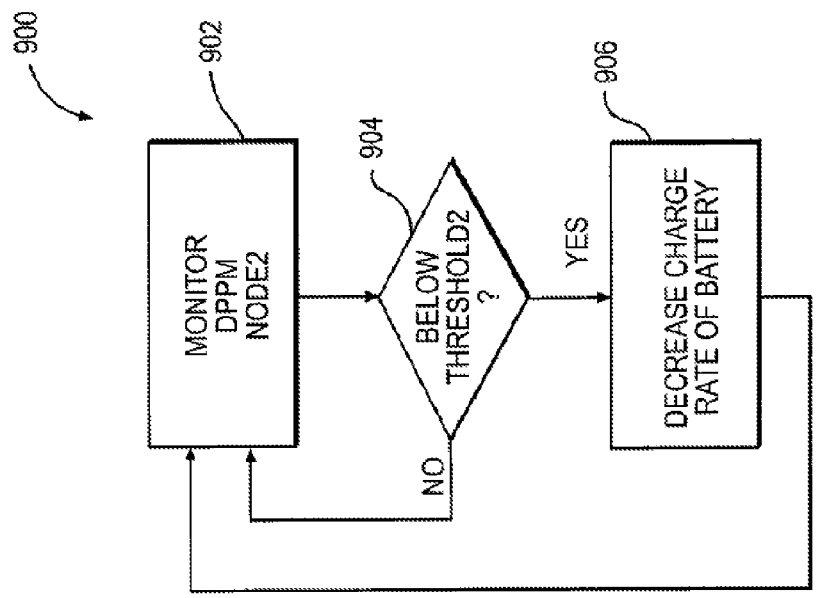
FIG. 8 is a flowchart of an example embodiment of another method for dynamic power management involving battery charging.

FIG. 8 shows a flow chart of a method 900 for dynamic power management according to another example embodiment. At step 902, the method 900 begins by monitoring the voltage level of the DPPM Node2 600. At step 902, the processor 545 checks whether the voltage level at DPPM Node2 600 is below a predetermined second threshold voltage level (i.e. threshold2). When the voltage level at DPPM Node2 600 is above the voltage level threshold2, the method 900 returns to monitoring at step 902. When the voltage level at the DPPM Node2 600 is below the threshold2 voltage level, at step 906, the processor 545 controls the voltage converter 560 to reduce the current provided to the battery charger 590 to decrease the charging rate of the battery. The method 900 then returns to monitoring the voltage level of the DPPM Node2 600 at step 902.

Embodiments in the present application can address the issues of board space, cost, power dissipation, available current during USB100 start-up, long charging time and support for low voltage level batteries and high system voltage level requirements. For example, during USB100 startup there is only 100 milliAmps of current available from the USB interface to power the system, however by appropriately boosting the voltage level provided to various components of the mobile device by an appropriate amount, the power requirements of these components can be met. In particular, the battery can be charged by USB current in a shorter charge time. Further, when a low voltage level battery is used, the voltage converter can convert the low voltage level from the battery to an appropriate value for some components of the mobile device that operate at a higher voltage level. Further, the boost voltage level is dynamic such that the voltage level of the voltage rail can be reduced in order to maximize system efficiency when high voltage level features are not required as previously described.

The embodiments described herein have a number of features such as: reducing the number of components required for power management (since only one voltage converter is used to perform power conversion efficiently for meeting various system voltage level requirements and providing battery charging); reducing manufacturing cost by reducing the number of components; increasing the available power for charging or system components by approximately 60% while decreasing the power dissipation by approximately four times, by placing the voltage converter on the input of the battery charger 590, when dealing with a low, dead or missing battery.

When the system is not charging, the system provides a dynamic power supply to increase efficiency and performance of the mobile device 100. For example, when on operating off of battery power and features requiring only low voltage levels are enabled, the output of the voltage converter 560 is lowered to lower the power consumption from the battery, thus increasing battery life. When higher power features are requested (i.e. increased audio volume, camera flash, increased LED brightness, and the like), the voltage converter 560 boosts the voltage level (possibly above the current battery voltage level) and provides the required voltage level for the duration of the function/event but then reduces the voltage level down to a lower more efficient output level when the increased voltage level is no longer required. The boost nature of this system also allows the use of a low voltage level battery since the system can operate at a higher voltage level even when the battery voltage level is below the required system voltage level.

Accordingly, the various embodiments described herein provide several useful features. For instance, a switching charger can be used in at least some cases. A voltage control loop is active on the input of the voltage converter, which keeps the input supply rail from collapsing. When only the output voltage level is monitored, the input supply rail may collapse to meet the output demand and as the input supply rail collapses the voltage converter becomes less efficient and actually collapses the input supply rail faster which will adversely affect the device. However, the use of a control loop on the input of the voltage converter allows for the reduction of current at the output of the voltage converter when the input (i.e. input supply rail) to the voltage converter starts browning out (i.e. collapsing) which effectively keeps the device functioning. Another feature is that the system voltage level can be different than the charging voltage level. This allows the efficiency of the system to be improved for different use cases. For example, when a camera flash was powered from a voltage rail the voltage rail can be set to 5 Volts while the battery is charging at a lower voltage level. This has very little overall impact to battery life but reduces space and cost because there is no need to add a separate voltage converter from the camera flash. Also, by using a buck-boost voltage converter allows providing higher system voltage levels than the battery voltage level for various use cases.

It will be understood that at least a portion of the systems and methods described herein may be embodied in software, for example, on a physical computer readable medium or the like, or hardware or some combination thereof. Similarly, the systems may be provided in and/or the methods may be performed by the microprocessor 102 of the mobile device 100 or by other components thereof. Examples of computer readable medium comprises a floppy disc, compact disc, read access memory, read-only memory, and any other type of computer readable component.

It should be understood that various modifications can be made to the example embodiments described and illustrated herein, without departing from the general scope of the appended claims. In particular, it should be understood that while the embodiments have been described for mobile communication devices, the embodiments are generally applicable to devices that operate in an environment with varying functions having differing power requirements and, in particular, in devices operating on battery power.

The invention claimed is:

1. A method for dynamic power management of a mobile device, the mobile device comprising a plurality of loads and a battery charger electrically connected to a voltage rail of the mobile device, the method comprising:
monitoring the plurality of loads to determine when at least one of the loads will become active or inactive;
determining a minimum required output voltage level to be provided by the voltage converter based on all active loads voltage level requirement and the at least one load that will become active or inactive voltage level requirement;
adjusting an input voltage level via the voltage converter to provide the minimum required output voltage level on the voltage rail in advance of the at least one load becoming active or after the at least one load becomes inactive;
monitoring the input voltage level;
determining whether the input voltage level is below a first predetermined threshold; and
when the input voltage level is below the first predetermined threshold, reducing the output voltage level provided by the voltage converter thereby reducing a charging rate of the battery charger.

2. The method of claim 1, wherein the method further comprises:
monitoring the output voltage level of the voltage converter;
determining whether the output voltage level of the voltage converter is below a second threshold; and
when the output voltage level of the voltage converter is below the second threshold, control the battery charger to reduce a charging current supplied to a charging battery.

3. The method of claim 1, wherein the step of adjusting the received input voltage level increases the output voltage level to a higher voltage level when the at least one load becomes active.

4. The method of claim 1, wherein the step of adjusting the received input voltage level comprises reducing the output voltage level to a lower voltage level when the at least one load becomes inactive.

5. A system for dynamic power management of a mobile device, the mobile device comprising a plurality of loads and a battery charger electrically connected to a voltage rail of the mobile device, the system comprising:
a single voltage converter electrically connected to the voltage rail and configured to receive an input voltage level and adjust the received input voltage level to provide an output voltage level to the voltage rail; and
a processor configured to:
monitor the plurality of loads to determine when at least one of the loads will become active or inactive;
determine a minimum required output voltage level to be provided by the voltage converter based on all active loads and the at least one load that will become active or inactive;
control the voltage converter to adjust the input voltage level to provide the minimum required output voltage level on the voltage rail in advance of the at least one load becoming active or after the at least one load becomes inactive;
monitor the input voltage level;
determine whether the input voltage level is below a first predetermined threshold; and
when the input voltage level is below the first predetermined threshold, control the voltage converter to reduce the output voltage level thereby reducing a charging rate of the battery charger.

6. The system of claim 5, wherein the processor is further configured to:
monitor the output voltage level of the voltage converter;
determine whether the output voltage level of the voltage converter is below a second predetermined threshold; and
when the output voltage level of the voltage converter is below the second predetermined threshold, control the battery charger to reduce a charging current supplied to a charging battery.

7. The system of claim 6, wherein the adjusting of the received input voltage level comprises increasing the output voltage level to a higher voltage level when the at least one load becomes active.

8. The system of claim 6, wherein the adjusting of the received input voltage level comprises reducing the output voltage level to a lower voltage level when the at least one load becomes inactive.

9. A computer readable medium storing instructions that, when executed on a processor, cause the processor to:
monitor a plurality of loads connected to a voltage rail to determine when at least one of the loads will become active or inactive;
determine a minimum required output voltage level for the voltage rail based on active loads and the at least one load that will become active or inactive; and
control a single voltage converter to adjust an input voltage level to provide the minimum required output voltage level on the voltage rail in advance of the at least one load becoming active or after the at least one load becomes inactive;
monitoring the input voltage level;
determining whether the input voltage level is below a first predetermined threshold; and
when the input voltage level is below the first predetermined threshold, reducing the output voltage level provided by the voltage converter thereby reducing a charging rate of the battery charger.

10. The method of claim 1, wherein, when more than one load is active, the output voltage level is set at an output voltage level for the active load that has a higher voltage level requirement.

11. The method of claim 1, wherein if the at least one load currently active requires a higher voltage than the load to be activated, then the output voltage level will not be increased.

12. The system of claim 5, wherein the processor is further configured to, when more than one load is active, set the output voltage level at an output load that has a higher voltage level requirement.

13. The system of claim 5, wherein the processor is further configured not to increase the output voltage level if the at least one load currently active requires a higher voltage than the load to be activated.

14. The system of claim 5, wherein the voltage converter is a buck/boost convertor.

15. The computer readable medium of claim 9, wherein the instructions case the processor to:
  monitor the output voltage level of the voltage converter;
  determine whether the output voltage level of the voltage converter is below a second predetermined threshold; and
  when the output voltage level of the voltage converter is below the second predetermined threshold, control the battery charger to reduce a charging current supplied to a charging battery.

16. The computer readable medium of claim 9, wherein the adjusting of the input voltage level comprises increasing the output voltage level to a higher voltage level in advance of the at least one load becoming active.

17. The computer readable medium of claim 9, wherein the adjusting of the input voltage level comprises decreasing the output voltage level to a lower voltage level in after the at least one load becomes inactive.

18. The computer readable medium claim of claim 9, wherein the instructions cause the processor to, when more than one load is active, set the output voltage level at an output voltage level for the active load that has the higher voltage level requirement.

19. The computer readable medium of claim 9, wherein the instructions cause the processor to not increase the output voltage level if the at least one load currently active requires a higher voltage than the load to be activated.

20. The computer readable medium of claim 9, wherein the voltage converter is a buck/boost converter.

* * * * *